US010190269B2

(12) United States Patent
Shah et al.

(10) Patent No.: US 10,190,269 B2
(45) Date of Patent: Jan. 29, 2019

(54) HIGH SPEED STEREOSCOPIC PAVEMENT SURFACE SCANNING SYSTEM AND METHOD

(71) Applicant: Fugro Roadware Inc., Mississauga (CA)

(72) Inventors: Hitesh Shah, Mississauga (CA); Prasanna Kumar Sivakumar, Austin, TX (US); Ishar Pratap Singh, Mississauga (CA); Miroslava Galchinsky, Mississauga (CA); David Lowe, Mississauga (CA)

(73) Assignee: FUGRO ROADWARE INC., Mississauga, Ontario (CA)

( * ) Notice: Subject to any disclaimer, the term of this patent is extended or adjusted under 35 U.S.C. 154(b) by 131 days.

(21) Appl. No.: 14/996,803

(22) Filed: Jan. 15, 2016

(65) Prior Publication Data

US 2017/0204569 A1    Jul. 20, 2017

(51) Int. Cl.
*G06T 7/593* (2017.01)
*E01C 23/07* (2006.01)
(Continued)

(52) U.S. Cl.
CPC .............. *E01C 23/07* (2013.01); *E01C 23/01* (2013.01); *G01B 11/303* (2013.01); *G06T 7/593* (2017.01);
(Continued)

(58) Field of Classification Search
None
See application file for complete search history.

(56) References Cited

U.S. PATENT DOCUMENTS 4,958,306 A    9/1990  Powell et al.
6,821,052 B2  11/2004  Zurn
(Continued)

FOREIGN PATENT DOCUMENTS

JP         63284409     11/1988
WO      WO2011023244    3/2011

OTHER PUBLICATIONS

Wang, Kelvin C.P. and Gong, Weiguo, Automated Real-Time Pavement Crack Detection and Classification, Transportation Research Board, May 2007 http://onlinepubs.trb.org/onlinepubs/archive/studies/idea/finalreports/highway/NCHRP111Final_Report.pdf.
(Continued)

*Primary Examiner* — Eileen M Adams (57) ABSTRACT

There is disclosed a mobile pavement surface scanning system and method. In an embodiment, the system comprises one or more light sources mounted on the platform for illuminating a pavement surface, one or more stereoscopic image capturing devices mounted on the platform that capture sequential images of the illuminated pavement surface and a movement sensor that encodes movement of the platform and provides a synchronization signal for time or distance synchronized image capture. One or more processors synchronize the images captured by the image capturing devices and stamps the images with one or more of time and distance data, calculate 3D elevation for each point on the pavement surface using stereoscopic principles, and assesses the quality of the pavement surface to determine the level of pavement surface deterioration.

24 Claims, 8 Drawing Sheets

(51) Int. Cl.

| | | |
|---|---|---|
| *E01C 23/01* | (2006.01) | |
| *H04N 5/225* | (2006.01) | |
| *G01B 11/30* | (2006.01) | |
| *H04N 13/204* | (2018.01) | |
| *H04N 5/222* | (2006.01) | |
| *H04N 5/247* | (2006.01) | |
| *H04N 13/254* | (2018.01) | |
| *H04N 13/239* | (2018.01) | |
| *H04N 13/00* | (2018.01) | |
| *H04N 13/243* | (2018.01) | |

(52) U.S. Cl.
CPC ......... *H04N 5/2226* (2013.01); *H04N 5/2256* (2013.01); *H04N 5/247* (2013.01); *H04N 13/204* (2018.05); *H04N 13/239* (2018.05); *H04N 13/254* (2018.05); *E01C 2301/00* (2013.01); *G06T 2207/10021* (2013.01); *G06T 2207/20224* (2013.01); *G06T 2207/30256* (2013.01); *H04N 13/243* (2018.05); *H04N 2013/0081* (2013.01)

(56) References Cited

U.S. PATENT DOCUMENTS

| | | |
|---|---|---|
| 7,616,329 B2 | 11/2009 | Villar et al. |
| 7,697,727 B2 | 4/2010 | Xu et al. |
| 7,801,333 B2 | 9/2010 | Laurent et al. |
| 7,850,395 B1 | 12/2010 | Brenner et al. |
| 8,306,747 B1 | 11/2012 | Gagarin et al. |
| 9,049,433 B1 | 6/2015 | Prince |
| 2003/0137673 A1 | 7/2003 | Cox |
| 2004/0160595 A1 | 8/2004 | Zivkovic |
| 2011/0118967 A1* | 5/2011 | Tsuda ................ B60W 30/10 701/117 |
| 2011/0221906 A1 | 9/2011 | Xu et al. |
| 2013/0018575 A1 | 1/2013 | Birken |
| 2013/0046471 A1 | 2/2013 | Rahmes et al. |
| 2013/0051913 A1 | 2/2013 | Eul |
| 2013/0076871 A1 | 3/2013 | Reeves |
| 2013/0136539 A1 | 5/2013 | Aardema |
| 2013/0155061 A1* | 6/2013 | Jahanshahi ............ G06T 15/00 345/419 |
| 2013/0329052 A1 | 12/2013 | Chew |
| 2014/0303853 A1* | 10/2014 | Itoh ..................... B60R 11/04 701/49 |
| 2014/0314279 A1 | 10/2014 | Zhang et al. |
| 2014/0347485 A1 | 11/2014 | Zhang et al. |
| 2014/0375770 A1 | 12/2014 | Habel et al. |
| 2015/0204687 A1* | 7/2015 | Yoon ................. G01C 21/3658 701/436 |
| 2015/0371094 A1 | 12/2015 | Gardiner et al. |
| 2016/0076934 A1* | 3/2016 | Low ................... G06K 9/00791 250/208.1 |

OTHER PUBLICATIONS

Wang et al., Automated Imaging Technologies for Pavement Distress Surveys, Transportation Research Circular E-C156, Jul. 1, 2011 http://onlinepubs.trb.org/onlinepubs/circulars/ec156.pdf.

Fraunhofer Institute, Pavement Profile Scanner pps, Fraunhofer Institute for Physical Measurement Techniques IPM, Jan. 1, 2015 http://www.ipm.fraunhofer.de/content/dam/ipm/en/PDFs/Product%20sheet/OF/LSC/pavement-profile-scanner.pdf.

Koch et al., Pothole Detection in Asphalt Pavement Images, Advanced Engineering Informatics 25 (2011) 507-515, Aug. 1, 2011 https://scholar.google.com/scholar?espv=2&biw=1184&bih=598&um=1&ie=UTF-8&lr&cites=8790872854322534042.

* cited by examiner

HIGH SPEED STEREOSCOPIC PAVEMENT SURFACE SCANNING SYSTEM AND METHOD

FIELD

This disclosure relates broadly to surface digitization systems and methods for accurate detection and assessment of pavement profiles.

BACKGROUND

An accurate assessment and identification of road pavement surfaces is required for timely maintenance of road pavements. Pavements develop many different modes of distresses over time, including but not limited to cracking, rutting, faulting, ponding, spalling and gravelling. The condition of the pavement can be determined by assessing the type, extent, location and severity of each of these different types of distresses, and remedial measures can be applied to fix these problems. In addition, it is also important to measure the roughness and texture of pavements periodically. Low roughness pavements result in low skid resistance, and high roughness pavements can cause travel discomfort and higher fuel consumption.

Pavement surface conditions are usually assessed using survey vehicles which continually collect pavement surface data as they travel along their designated routes. A number of pavement condition assessment systems have been built in the past four decades. These systems use different sensors to digitize the road surface and roughly fall under one of the following two categories:

(1) Imaging systems, which use camera or sets of cameras and lighting systems to record a view of the pavement surface. These systems usually use high resolution line scan cameras for accurate imaging. The individual lines scanned by the camera are stitched after some distance to get a two-dimensional image of the area scanned. They capture an entire area of the lane in which the survey vehicle is traveling in. Surface data captured with these systems are usually used for distress detection, but if the data is of very high resolution, roughness and texture estimation could be done with it as well.

(2) Profiling systems, which use lasers, ultrasound or other time of flight sensors to record the elevation map of the pavement surface. These systems do not measure the entire surface of the road, but rather produce profiles at fixed intervals along a fixed number of lines on the road, usually the lines on which the wheels of the survey vehicle travel. Since they do not cover the entire area of the pavement, data captured is usually not used for distress detection. Instead, it is mainly used for roughness and texture estimation.

The recorded road surface is then either assessed manually or automatically according to various pavement assessment standards.

Stereoscopy is the extraction of three dimensional (3D) elevation information from digital images obtained by imaging devices such as CCD and CMOS cameras. By comparing information about a scene from two vantage points, 3D information can be extracted by examination of the relative positions of objects in the two panels. This is similar to the biological process Stereopsis, a process by which the human brain perceives the 3D structure of an object using visual information from two eyes.

In the simplest form of the technique, two cameras displaced horizontally from one another are used to obtain two differing views on a scene. By comparing these two images, the relative depth information can be obtained, in the form of disparities, which are inversely proportional to the differences in distance to the objects. To compare the images, the two views must be superimposed in a stereoscopic device.

For a two camera stereoscopic 3D extraction technique, the following steps are performed:

(a) Image Rectification: Transformation matrix $R_{rect}$ transforms both the images to one common plane of comparison is identified. The left camera image is rectified by applying $R_{rect}$ and the right camera image by applying $R*R_{rect}$ to all the pixels.

(b) Disparity Map generation: For each pixel on the left camera image a matching pixel along the same scan line is identified on the right camera image using a localized window based search technique. For each pixel, $p_l$ (x, y) in the left image, the system and method identifies the matching pixel $p_r$ (x+d, y) in the right pixel where d is the pixel disparity.

(c) 3D reconstruction: At each point $d_{(x,y)}$ in the disparity map, the system and method calculates the elevation $Z_{(x,y)}$ by triangulation.

Stereoscopy has been used for pavement quality assessment in U.S. Pat. No. 8,306,747. The system utilizes Ground Penetrating Radar (GPR) along with stereo cameras to obtain high resolution images, and is not designed for operation at highway speeds. The system also does not use the image data directly for distress detection and measurement.

Techniques similar to multiple-camera stereoscopy like photometric stereoscopy has also been used in pavement assessment in Shalaby et al. ("Image Requirements for Three-Dimensional Measurements of Pavement Macrotexture", Journal of the Transportation Research Board, Issue Volume 2068/2008, ISSN 0361-1981.) However, the system uses a conventional camera with four single point light sources, and is not designed for high-speed operation. The technique is used to characterize pavement surface textures.

Stereoscopic imaging has also been used for inspection of objects on a conveyor belt using both individual photosensors (U.S. Pat. No. 3,892,492) or using a line-scan camera (U.S. Pat. No. 6,166,393 and U.S. Pat. No. 6,327,374). They are also specifically designed to identify defective rapidly moving objects moving on a conveyor belt past a stationary sensor system, rather from a moving platform for road pavement evaluation.

What is therefore needed is an improved system and method for pavement scanning that overcomes some of the disadvantages of the prior art.

SUMMARY

The present disclosure relates to a high speed pavement scanning system and method capable of producing a 3D profile of the pavement surface using a pair of stereoscopic image capturing devices, or any number of pairs of such devices and lighting source(s) for accurate assessment of the pavement surface quality. The present system and method can be applied to capturing and assessment of any pavement surface, such as road pavements, bridge decks and airport runways.

In an embodiment, the system comprises a movable platform mounted to a survey vehicle. An illumination module, comprising at least one light source, is provided on the platform, and is used to illuminate the pavement surface. The light source may be of any type, wavelength and power.

Multiple similar light sources may be used for this purpose depending on the width of the pavement surface being captured and/or the power and design limitations of the movable platform it is mounted on.

An image capturing module, comprising at least one pair or multiple pairs of stereoscopic image capturing devices mounted on the platform, captures sequential images of the illuminated pavement surface. The image capturing devices may be externally fitted with any type of lens-filters, depending on the pavement assessment needs and environmental challenges.

Distance Measurement Instruments (DMI), such as a combination of positioning sensors, encode the movement of the survey vehicle carrying the platform and provides a synchronization signal for synchronizing the images captured by the multiple stereo camera pairs.

The system further includes at least one computer with processing means that synchronizes the images captured by the individual cameras in a stereo pair, and stamps images with at least one of time and distance data. The system also calculates the 3D elevation for each point on the pavement surface using stereoscopic principles assesses the quality of the pavement surface and measures the level of deterioration.

In another aspect, there is provided a method of detecting pavement deterioration and assessing the pavement quality, including the steps of: illuminating a pavement surface from a light source or multiple similar sources; capturing images of the illuminated surface one or more stereoscopic image capturing devices; processing the captured images to synchronize the images captured, and calculating the 3D elevation for each point on the pavement surface.

Further features will be evident from the following description of preferred embodiments. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DETAILED DESCRIPTION OF THE INVENTION

As noted above, the present disclosure relates to a system and method for collecting high resolution 3D profile of the pavement surface at high speed. The purpose of the system and method is to collect information that allows a more accurate measurement of various different modes of distress that have formed on a road pavement surface. These measurements can then be used to manually or automatically assess road condition, such as cracking, rutting and surface texture.

In an embodiment, the proposed system is mounted to a survey vehicle, and comprises a number of elements: (1) A number of high brightness illumination units, suitably two LED sources 130A and 130B of blue wavelength. (~480 nm); (2) A number, suitably two, of stereoscopic image capture devices 104A and 104B which may be a high speed line scan camera 120 and frame grabber 150A and 150B with each of the cameras externally fitted with a sunlight filter 103; (3) A combination of wheel-encoder 105A, GPS 105B and IMU 105C mounted to the vehicle allowing movement detection; and (4) A data-storage 510 and processing 520 means.

Figure 1:
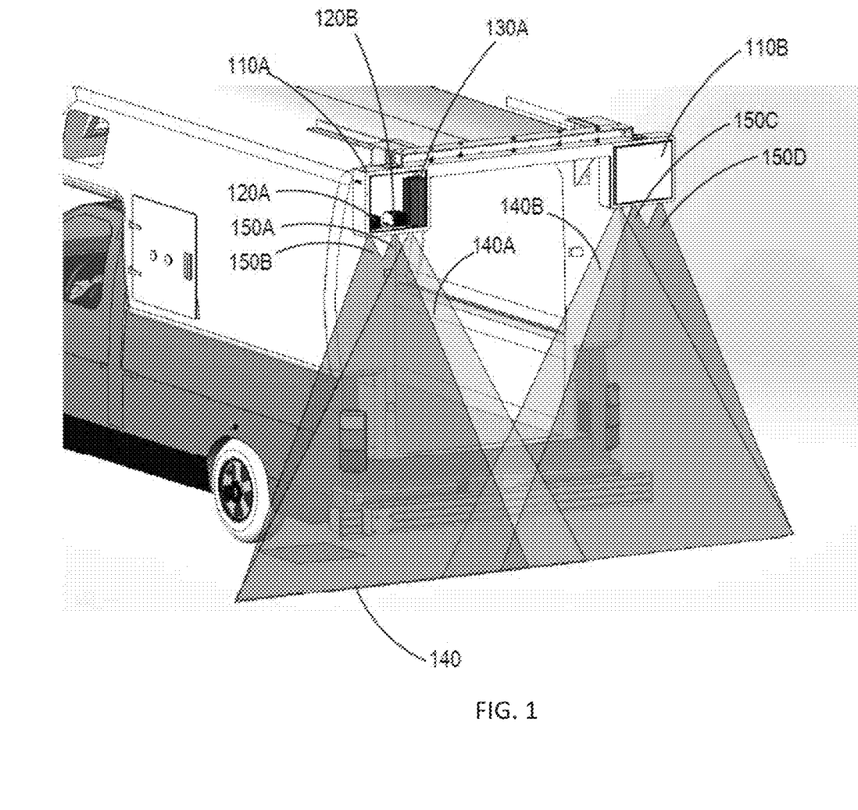
FIG. 1 shows one possible configuration of the scanning system mounted on the survey vehicle. The system shown has two pairs of stereoscopic line-scan cameras and two light sources in accordance with an illustrative embodiment.

The illumination system 130 may be one very powerful illumination source that covers the entire width of a pavement surface of interest, or multiple illumination sources that together cover the width of the pavement surface of interest. When multiple sources are used, each source may be fitted together with an image capturing device, and housed together in a cabinet to be protected from environmental damages, as shown by way of example in FIG. 1. FIG. 1 shows an illustrative vehicle mounted system with two such cabinets 110A, 110B which are mounted at the upper left corner and upper right corner of the rear of the vehicle. As shown, these two units may be interconnected via cables through a ducted frame holding the two cabinets in position.

The two light sources 130A and 130B continuously illuminate the width of the pavement as the vehicle travels forward, in order to allow the one or more stereoscopic image capture devices to record a sequence of pavement surface images.

When multiple sources are used, a part of the width of the pavement illuminated by one source may overlap with the width illuminated by the others as shown in FIG. 1. In FIG. 1 coverage width 140 is obtained by coverage width 140A from a first light source 130A which partially overlaps with coverage width 140B from a second source inside the second cabinet 110B.

In an embodiment, the orientation of the light source 110 with respect to the pavement surface is determined by the cabinet. Inside the cabinet, the light source is placed with no rotation, with the beam parallel to one of the long faces of the cabinet as shown in FIG. 1.

Figure 2:
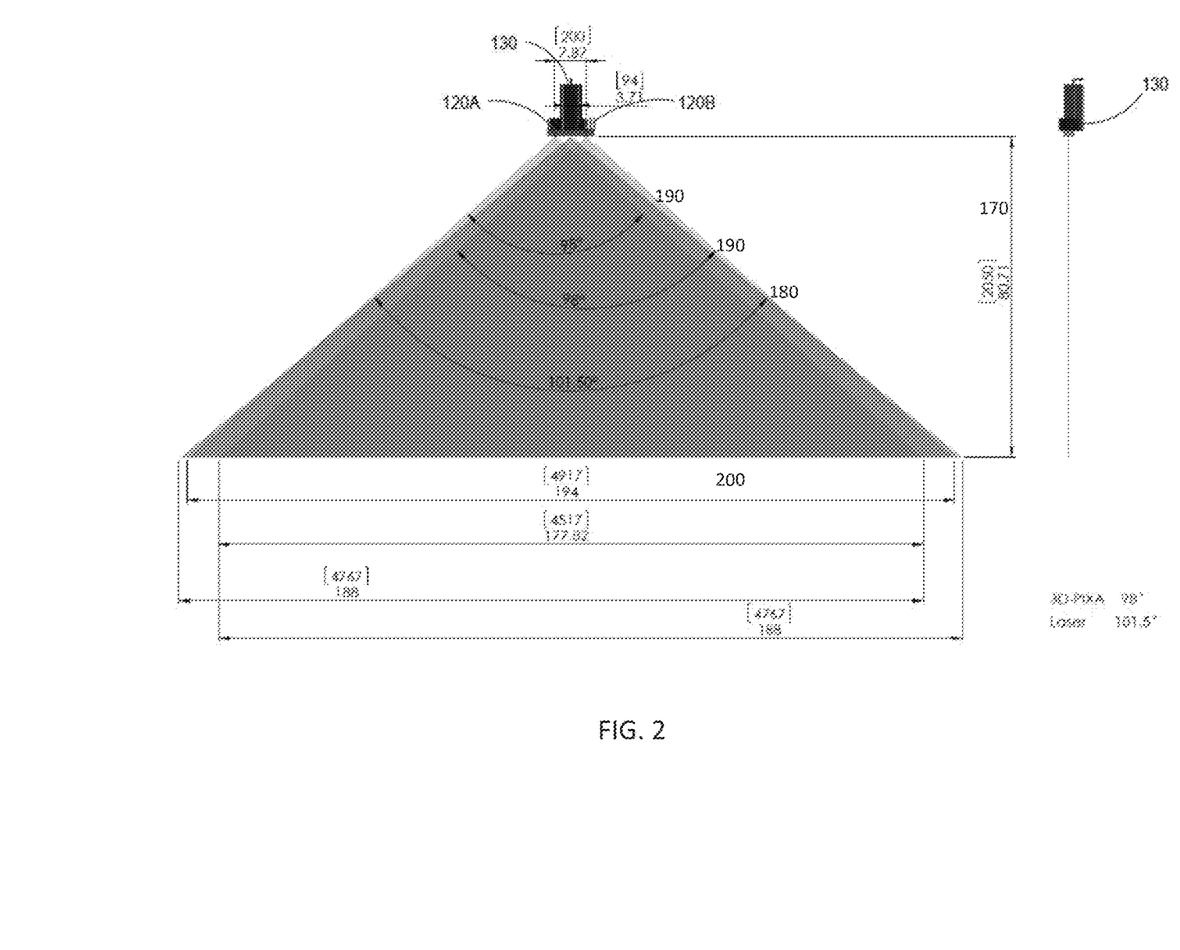
FIG. 2 is one possible configuration of a stereoscopic line-scan camera pair and a light source shown together in accordance with an illustrative embodiment.

The image capturing system 104, may be one wide-angle stereoscopic image capturing device or multiple medium-angle or narrow-angle devices that capture the width of the pavement. A stereoscopic image capturing device 104A consists of two cameras, left camera 120A and right camera 120B. Both the left and right cameras capture almost the same width of the pavement 140A and 140B, as shown in FIG. 1 and FIG. 2, which forms the basis of 3D profile estimation using stereoscopic principles. Each camera may be a single integrated unit or a separate high speed line scan camera 120 and frame grabber 150A and 150B.

Depending on the width of the pavement surface 140 to be captured and the width that a single stereoscopic pair can capture 140A, multiple similar pairs may be used as shown in FIG. 1. Similar to the illumination system, when multiple image capturing devices are used, the width of the pavement captured by one stereoscopic pair may overlap with the width captured by the others as shown in FIG. 1.

Each of the cameras in a stereoscopic camera pair may be fitted with a lens filter 103A and 103B externally to overcome the environmental challenges like abnormal sunlight condition or wet pavements.

Figure 4A:
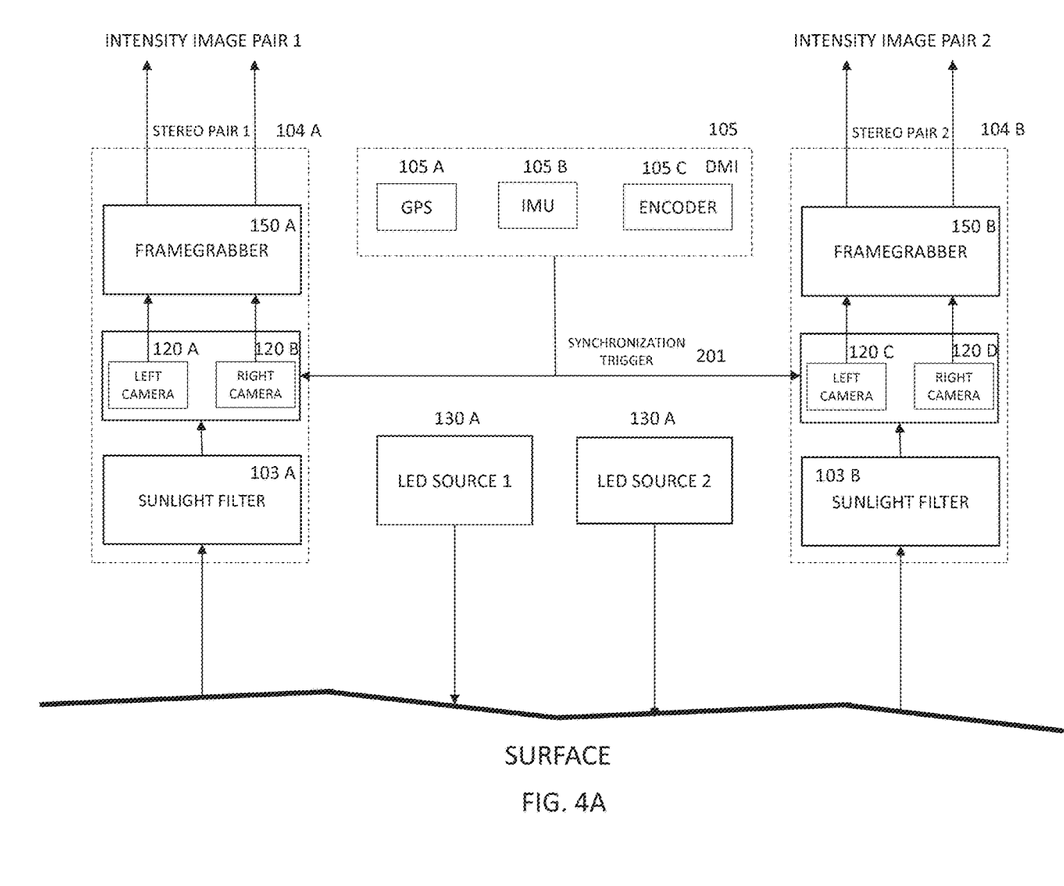
FIG. 4A is a schematic block diagram the data capture scheme used for the scanning system in accordance with an illustrative embodiment.

FIG. 4A shows one possible configuration of a Data Capturing System. The image capturing system with two high speed stereoscopic line scan camera pairs 104A and 104B, in combination with a sunlight filters 103A and 103B, captures the pavement surface 109 at high resolution, using a frame grabber cards 150A and 150B. The illumination system with two LED light sources 130A and 130B illuminates the pavement surface.

Figure 3:
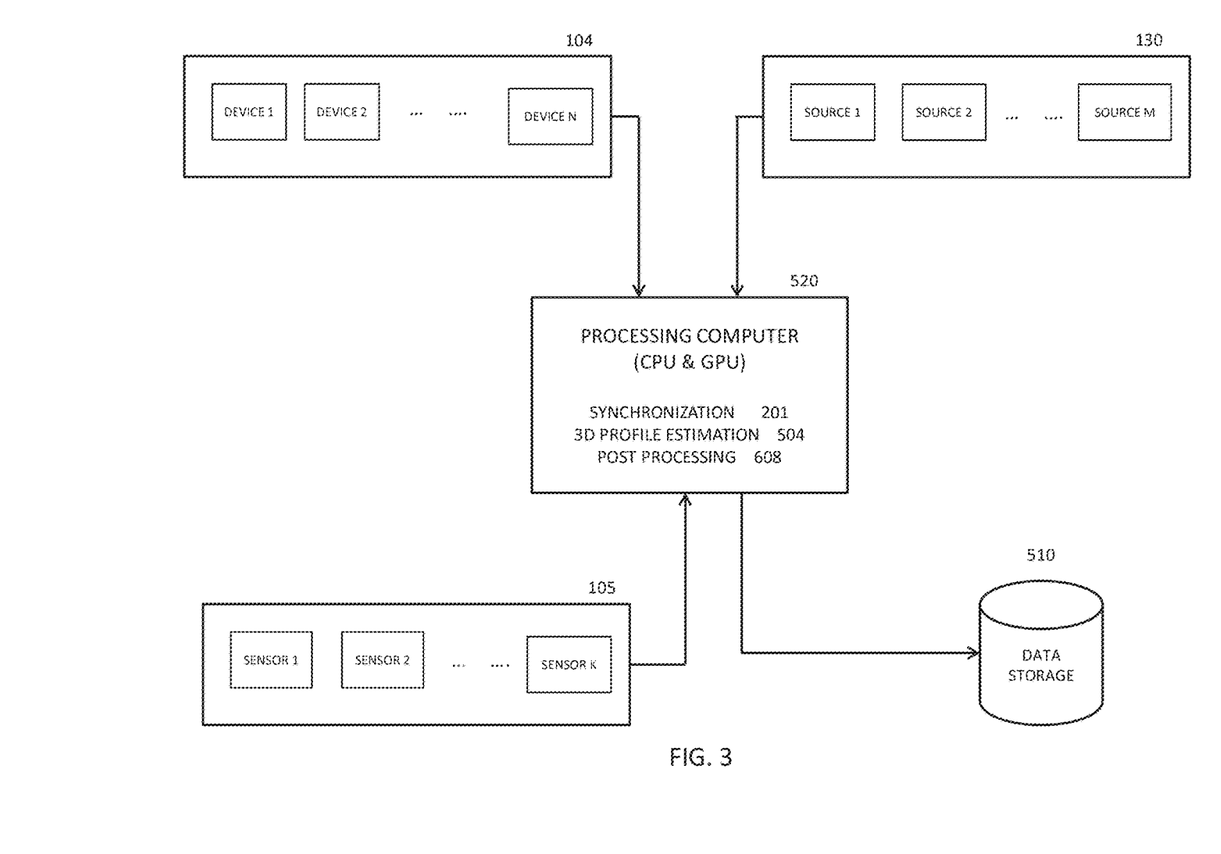
FIG. 3 is a schematic block diagram of the scanning system in accordance with an illustrative embodiment.
Figure 4B:
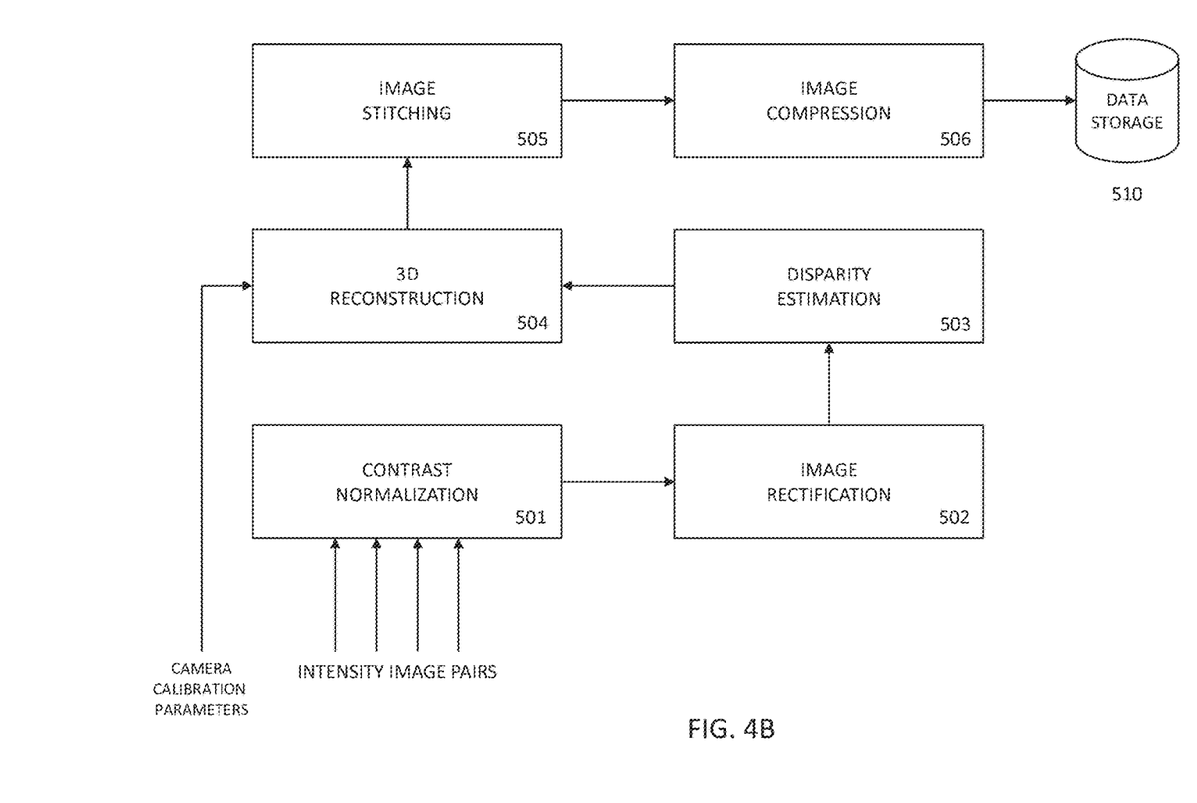
FIG. 4B is a schematic block diagram of the image processing scheme used for the scanning system in accordance with an illustrative embodiment.

A combination of a Global Positioning System (GPS) 105A, Inertial Measurement Unit (IMU) 105B and Wheel Encoder 105C, collectively referred to as Distance Measurement Instruments (DMI) 105, detects the movement of the system as shown in FIG. 3. The individual sensors are placed at different locations inside the survey vehicle. Together, they capture any movement of the survey vehicle such as longitudinal distance traveled, velocity in the direction of travel and angle of tilt relative to pavement surface. DMI also produces synchronization signals 201 based on distance traveled by the survey vehicle which is used to trigger the stereoscopic cameras for synchronized data capture independent of the vehicle velocity as shown in FIG. 4B. DMI may also produce the synchronization signals based on the time elapsed.

The movement data from the DMI is used to augment the data captured by the image capturing devices to correct for pavement abnormalities and obtain more accurate 3D estimates 609. For example, if the vehicle is traveling over an uneven surface or stretch of banked pavement which is angled to one side or when the vehicle bounces, the DMI data is used to account for the movement of the system relative to the pavement surface.

As the survey vehicle travels forward, the image capturing devices are triggered at equal distance or time intervals, in rapid succession, by the DMI. In an embodiment, this trigger pulse may be generated using an encoder or vehicle speed sensor 105C, connected to the drive train or directly to the wheel. At each pulse, the individual cameras of a stereoscopic pair capture a line of pavement surface illuminated by the illumination source. The captured lines are then digitized into a line of grayscale intensities using the frame grabber card. The frame grabber captures a fixed number of such lines and stitches them together one line after another to form a two dimensional (2D) intensity image.

Figure 5:
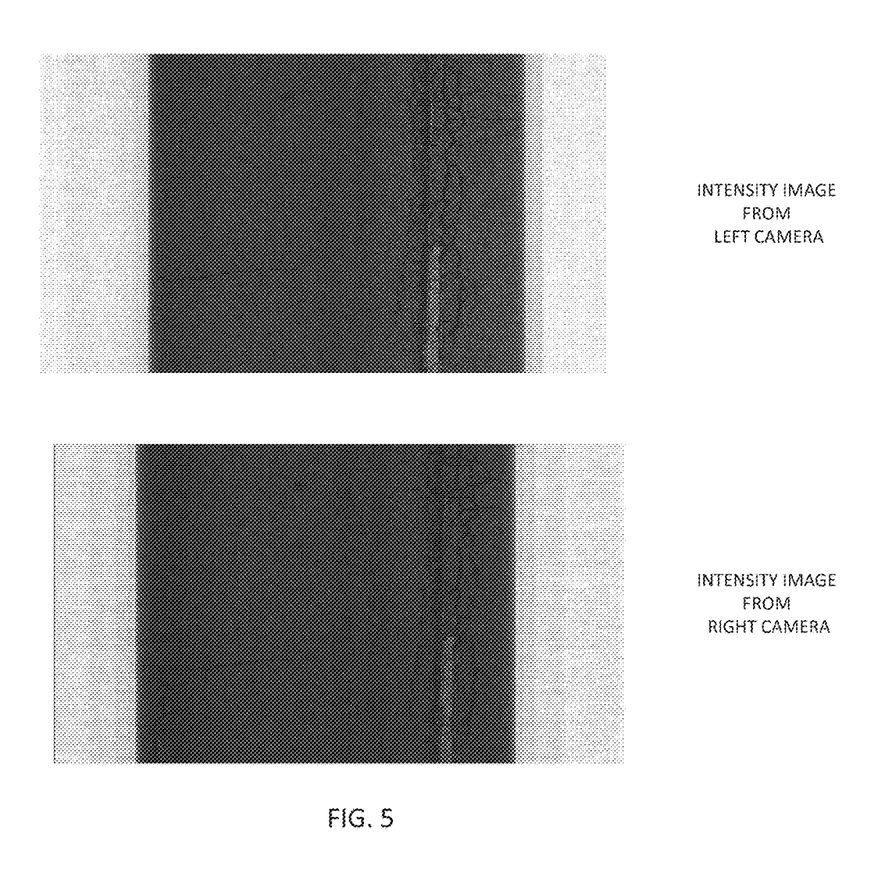
FIG. 5 shows sample grayscale images of a pavement surface captured by left and right cameras of a stereoscopic image capturing device in accordance with an illustrative embodiment.
Figure 6:
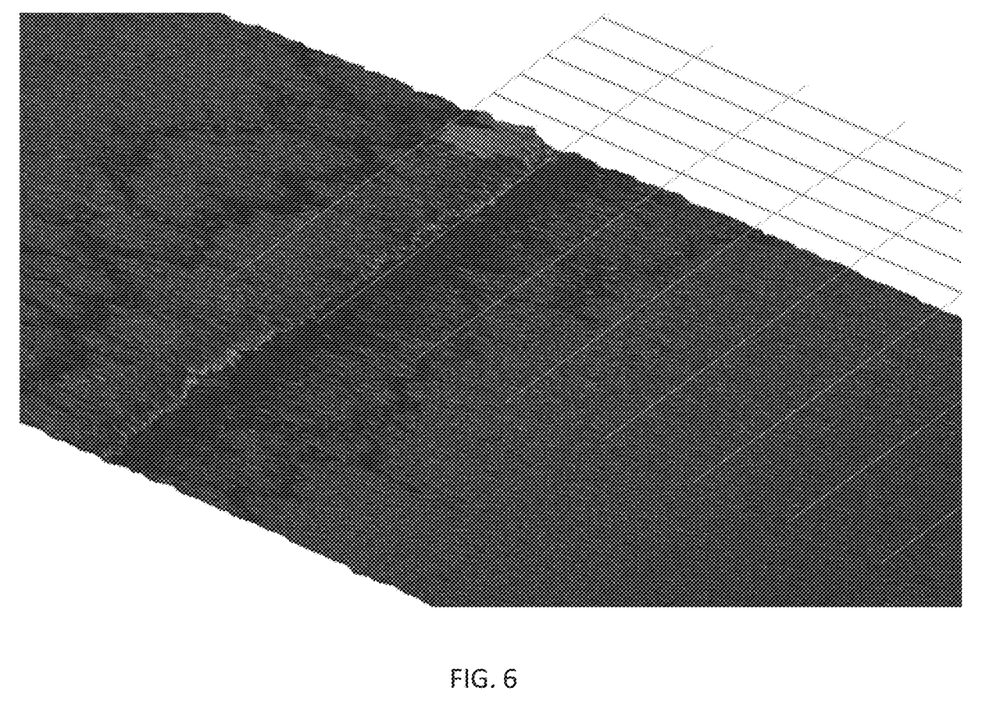
FIG. 6 is the 3D profile of the pavement surface obtained using the images shown in FIG. 5 in accordance with an illustrative embodiment.

The result is a set of four, time or distance synchronized, 2D intensity images. The intensity images captured by the left and right cameras of one of the two stereoscopic pairs of a sample system are shown in FIG. 5.

At this stage, the images are processed and saved as shown in FIG. 4B. Image processing comprises of external artifact removal 501, image rectification 502, disparity estimation 503, 3D profile estimation 504, image stitching 505, and image compression 506. Image processing is performed on-board 520, as the vehicle travels. Alternatively these steps can be done in a post-processing stage.

As shown in FIG. 4B, the first step in image processing is to reduce the effect of sunlight within the images. Initially, the sunlight filters on the stereoscopic cameras reduce the effects of sunlight as much as possible. However to obtain good contrast images with accurate gradient estimates, further reduction of the effects of sunlight is often necessary. To rectify this problem, an ancillary image of the surface can be taken with no artificial lighting, only sunlight. This image with only sunlight illuminating the surface is then used to remove the effect of sunlight in the other images collected by the system. This is performed after each of the images has been aligned, as described previously. By subtracting the sunlight only image from the original images using digital processing, sunlight free images can be produced. This technique also removes the effect of imaging sensor DC bias. Alternatively, if an ancillary image without artificial lighting cannot be taken, this step may be replaced with simple contrast normalization techniques 501 which effectively spread out the most frequent intensity value.

Once the external artifacts have been removed from the images, the technique of stereoscopy is applied to the data. This produces the 3D elevation at each point on the pavement surface. The preferred technique uses images from two individual cameras of the stereo pair and for each point on the pavement, identifies the corresponding pixel on both the images and estimates the 3D elevation as a factor of relative pixel distance between the matching pixels. The stereo camera pairs are calibrated and the focal length (f), principal centers (P) of the individual cameras and the relative rotation (R) and Translation (T) between the two cameras are known.

The following steps are performed:

(a) The first step is Image Rectification 502. The system and method identifies a common $R_{rect}$ matrix that when applied will transform the left and right images to a common plane where they can be compared pixel to pixel. The system and method determines this $R_{rect}$ matrix using the Translation vector (T).

$$e_1 = \frac{T}{\|T\|} \quad e_2 = \frac{1}{\sqrt{T_x^2 T_y^2}}[-T_y, T_x, 0]';$$

$$e_3 = e_1 \times e_2 \quad R_{rect} = \begin{bmatrix} e_1' \\ e_2' \\ e_3' \end{bmatrix}$$

The system and method rectifies the left image by applying the $R_{rect}$ matrix to each pixel in the image. For each pixel, $p_l$, the system and method computes $R_{rect}*p_l$. Similarly the system and method rectifies the right image by applying $R*R_{rect}$ to each pixel. For each pixel, $p_r$, the system and method computes $R*R_{rect}*p_r$. This transforms both the images to one common plane for easy comparison.

(b) The next step is to generate a Disparity Map 503. For each pixel in the left image, the system and method identifies a matching pixel in the right image. Since the images are rectified, the search space to identify the matching pixel is limited to the corresponding scan line. The system and method uses a localized window based correlation technique to identify the matching pixels. For each pixel, $p_l(x, y)$ in the left image, the system and method identifies the matching pixel $p_r$ (x+d, y) in the right pixel where d is the pixel disparity.

(c) The final step is 3D reconstruction 504. At each point $d_{(x,y)}$ in the disparity map the system and method calculates the elevation $Z_{(x,y)}$ by triangulation.

$$Z_{(x,y)} = \frac{T_x * f}{d_{(x,y)}}$$

The 3D pavement profile, obtained using the disparity image which is obtained using the grayscale images shown in FIG. 5, is shown in FIG. 7.

Once the 3D range maps are obtained from each of the stereo pairs, at 505, the system and method stitches the range maps obtained by the stereo pairs to horizontally to obtain one 3D range map for the entire 4 meters wide pavement. Similarly, the system and method stitches the left camera images of each of the stereo pairs to obtain one stitched intensity image of the 4 meters wide pavement. Alternatively, the corresponding right camera images may be stitched.

After image capturing, stereoscopic 3D reconstruction and image stitching, eight images are obtained: two intensity images from the first stereo pair, two intensity images from the second stereo pair, one range image from the first stereo pair, one range image from the right stereo pair, one stitched intensity image and one stitched range image. A file compression 506 technique such as JPEG encoding, ZIP encoding and LZW encoding is applied to minimize the sizes of all the images and save them to a data storage device 510 on board.

Figure 4C:
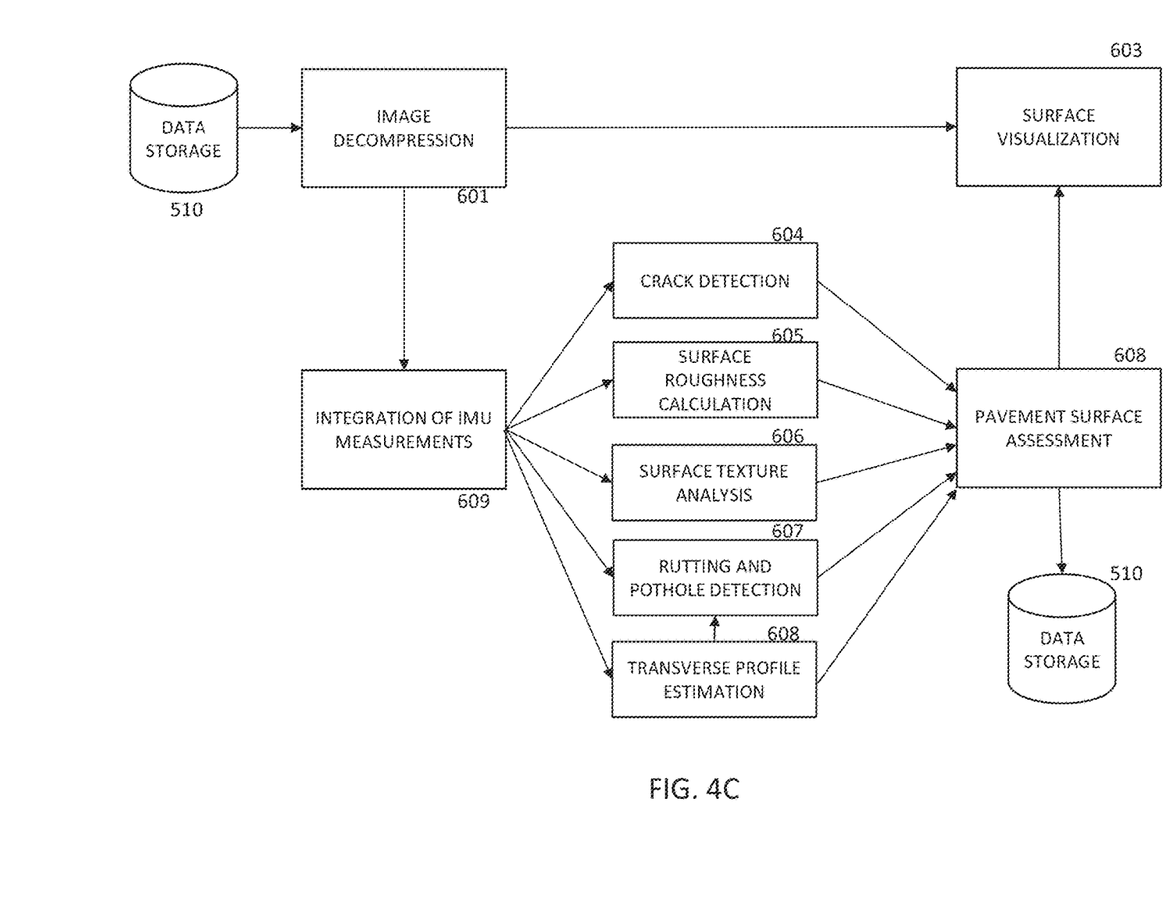
FIG. 4C is a schematic block diagram of the data post-processing scheme used for the scanning system in accordance with an illustrative embodiment.

Any or all of the steps involved in image processing stage can be performed by one or multiple units of Central Processing Unit (CPU) 520A or Graphics Processing unit (GPU) 520B as shown in FIG. 4C.

At the post processing and extraction stage, the recorded data is retrieved from a data storage 510, decompressed 601, and then passed to a number of modules as shown in FIG. 4C.

The high resolution 3D profile can be used to extract a number of pavement features. Through the automatic identification and classification of each of these features, an assessment of the road surface condition can be made 608. These include, but are not limited to:

(1) Identification of surface cracking (both sealed and unsealed) 604.
(2) Extraction of road roughness 605.
(3) Identification of areas with low texture depth, which can be due to asphalt bleeding or polishing 606.
(4) Identification of pot holes and rutting 607.
(5) Identification of areas where there is surface depression or corrugation which can indicate areas of high moisture or voiding.
(6) Extraction of Transverse Profile for rutting estimation 608.
(7) Surface comparison between scans, allowing detection of surface change with time.
8) Identification and removal of spurious road targets such as sticks and other debris, which can confuse crack detection algorithms.
9) Identification of patches.
10) Identification of areas of water bleeding.

The 3D profile can be used along with intensity images to improve the distress detection, especially, cracking 604.

Cracks are identified both in the gradient and intensity images. Both the shape and intensity is then used to classify the features as cracks, sealed cracks or other road features. The main advantages over using just the 3D profile is the ability to eliminate false targets such as markings on the road. An example is an oil spill which is often incorrectly identified as a crack, as it will only appear within the intensity image, not the 3D range images. It also improves the identification of other surface features that could lead to false positives, such as road markings, wheel marks, sticks and other road debris.

Another highly useful element of the system is the ability to identify sealed distresses like sealed cracks. Cracks are often sealed using bitumen, which to a normal surface image camera still appear as a dark line within the image. With the stereoscopic 3D profile estimation technique it is possible to detect the presence of the flat bitumen surface in contrast to the depression caused by an unsealed crack.

Modules may also employ Machine Learning techniques to detect the distresses. The modules, instead of employing a series of mathematical calculations with hard-coded constants (heuristic methods), learn the shape and structure of the distresses from manually labelled historical data and try to predict the presence of distress on the captured pavement image. Each distress type has unique characteristics and it repeats wherever the distress appears again. Machine learning based modules are proven to be more accurate than heuristic method employing methods for detecting objects in an image.

In the display module 603, the data produced can be displayed directly to the user on the on-board monitor. The display module may display just the intensity image or both intensity image and 3D profile. According to the user preferences, the module may also display the detected distresses overlaid on the intensity image. The distresses displayed may be color-coded to indicate the level of severity.

Thus, in an aspect, there is provided a mobile pavement surface scanning system, comprising: one or more light sources for illuminating a pavement surface; one or more stereoscopic image capturing devices for capturing sequential images of the illuminated pavement surface; a plurality of positioning sensors adapted to encode movement of the system and provide a synchronization signal for the sequential images captured by the one or more stereoscopic image capture devices; and one or more processors adapted to: synchronize the images captured by each camera in the one or more stereoscopic image capturing devices, and stamp the images with one or more of time data and distance data; calculate a 3D elevation for each point on the pavement surface using stereoscopic principles; and assess the quality of the pavement surface using the 3D elevation data to determine the level of deterioration.

In an embodiment, the one or more light sources are light emitting diodes.

In another embodiment, the one or more light sources are lasers with line generating optics.

In another embodiment, the one or more stereoscopic image capturing devices comprise line scan cameras with frame grabbers.

In another embodiment, the system further comprises a synchronization module adapted to receive a signal from the plurality of positioning sensors, and provides a sequence of triggers to the line scan cameras for time synchronized image capturing.

In another embodiment, the system further comprises a Central Processing Unit adapted to compute a 3D elevation at each point on the pavement surface.

In another embodiment, the system further comprises a Graphical Processing Unit adapted to compute the 3D elevation at each point on the pavement surface In another embodiment, the one or more processors is further adapted to correlate the 3D profile data with image intensity data to identify distressed regions of pavement.

In another embodiment, the system further comprises sunlight filters for filtering the images of the illuminated pavement surface.

In another embodiment, the system further comprises polarizing filters for filtering the images of the illuminated pavement surface.

In another aspect, there is provided a mobile pavement surface scanning method, comprising: illuminating a pavement surface utilizing one or more light sources; capturing sequential images of the illuminated pavement surface utilizing one or more stereoscopic image capturing devices; utilizing a plurality of positioning sensors, encoding movement and providing a synchronization signal for the sequential images captured by the one or more stereoscopic image capture devices; and utilizing one or more processors to: synchronize the images captured by each camera in the one or more stereoscopic image capturing devices, and stamp the images with one or more of time data and distance data; calculate a 3D elevation for each point on the pavement surface using stereoscopic principles; and assess the quality of the pavement surface using the 3D elevation data to determine the level of deterioration.

In another embodiment, the one or more light sources are light emitting diodes.

In another embodiment, the one or more light sources are lasers with line generating optics.

In another embodiment, the one or more stereoscopic image capturing devices comprise line scan cameras with frame grabbers.

In another embodiment, the method further comprises receiving at a synchronization module a signal from the plurality of positioning sensors, and providing a sequence of triggers to the line scan cameras for time synchronized image capturing.

In another embodiment, the method further comprises computing a 3D elevation at each point on the pavement surface utilizing a Central Processing Unit.

In another embodiment, the method further comprises computing the 3D elevation at each point on the pavement surface utilizing a Graphical Processing Unit.

In another embodiment, the method further comprises correlating the 3D profile data with image intensity data to identify distressed regions of pavement.

In another embodiment, the method further comprises providing sunlight filters for filtering the images of the illuminated pavement surface.

In another embodiment, the method further comprises providing polarizing filters for filtering the images of the illuminated pavement surface.

Throughout the description and claims to this specification the word "comprise" and variation of that word such as "comprises" and "comprising" are not intended to exclude other additives, components, integrations or steps. While various illustrative embodiments have been described, it will be appreciated that these embodiments are provided as illustrative examples, and are not meant to limit the scope of the invention, as defined by the following claims.

The invention claimed is:

1. A mobile vehicle mounted pavement condition assessment system, comprising:
   one or more light sources mounted on the mobile vehicle for illuminating a pavement;
   one or more stereoscopic image capturing devices mounted on the mobile vehicle for capturing sequential images of the illuminated pavement;
   a plurality of positioning sensors mounted on the mobile vehicle, the positioning sensors adapted to encode movement of the mobile vehicle and provide a synchronization signal for the sequential images captured by the one or more stereoscopic image capture devices; and
   one or more processors adapted to:
      synchronize the images captured by each camera in the one or more stereoscopic image capturing devices;
      calculate a 3D elevation for each point on the pavement using stereoscopic principles; and
      assess the condition of the pavement using the 3D elevation data.

2. The system of claim 1, wherein the one or more light sources are light emitting diodes.

3. The system of claim 1, wherein the one or more light sources are lasers with line generating optics.

4. The system of claim 1, wherein the one or more stereoscopic image capturing devices comprise line scan cameras with frame grabbers.

5. The system of claim 1, further comprising a synchronization module adapted to receive a signal from the plurality of positioning sensors, and provide a sequence of triggers to the line scan cameras for time synchronized image capturing.

6. The system of claim 1, further comprising a Central Processing Unit adapted to compute a 3D elevation at each point on the pavement.

7. The system of claim 1, further comprising a Graphical Processing Unit adapted to compute the 3D elevation at each point on the pavement.

8. The system of claim 1, wherein the one or more processors is further adapted to correlate the 3D profile data with image intensity data to identify distressed regions of pavement.

9. The system of claim 1, further comprising sunlight filters for filtering the images of the illuminated pavement.

10. The system of claim 1, further comprising polarizing filters for filtering the images of the illuminated pavement.

11. A method for a mobile vehicle mounted pavement condition assessment system, comprising the steps of:
    illuminating pavement utilizing one or more light sources mounted on the mobile vehicle;
    capturing sequential images of the illuminated pavement utilizing one or more stereoscopic image capturing devices mounted on the mobile vehicle;
    utilizing a plurality of positioning sensors mounted on the mobile vehicle to encode movement of the mobile vehicle, and providing a synchronization signal for the sequential images captured by the one or more stereoscopic image capture devices; and utilizing one or more processors to:
       synchronize the images captured by each camera in the one or more stereoscopic image capturing devices;
       calculate a 3D elevation for each point on the pavement using stereoscopic principles; and
       assess the condition of the pavement using the 3D elevation data.

12. The method of claim 11, wherein the one or more light sources are light emitting diodes.

13. The method of claim 11, wherein the one or more light sources are lasers with line generating optics.

14. The method of claim 11, wherein the one or more stereoscopic image capturing devices comprise line scan cameras with frame grabbers.

15. The method of claim 11, further comprising receiving at a synchronization module a signal from the plurality of positioning sensors, and providing a sequence of triggers to the line scan cameras for time synchronized image capturing.

16. The method of claim 11, further comprising computing a 3D elevation at each point on the pavement utilizing a Central Processing Unit.

17. The method of claim 11, further comprising computing the 3D elevation at each point on the pavement utilizing a Graphical Processing Unit.

18. The method of claim 11, further comprising correlating the 3D profile data with image intensity data to identify distressed regions of pavement.

19. The method of claim 11, further comprising providing sunlight filters for filtering the images of the illuminated pavement.

20. The method of claim 11, further comprising providing polarizing filters for filtering the images of the illuminated pavement.

21. The system of claim 1, wherein the synchronization comprises of stamping the images with one or more of time data and distance data.

22. The system of claim 1, wherein the system is used to determine the level of deterioration.

23. The method of claim 11, whereby the synchronization comprises of stamping the images with one or more of time data and distance data.

24. The method of claim 11, whereby the system is used to determine the level of deterioration.

* * * * *